(No Model.)
J. O'LEARY
PIPE COUPLING.
No. 364,666. Patented June 14, 1887.
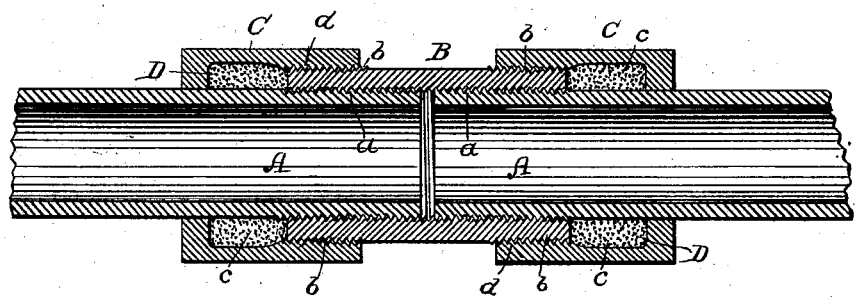
WITNESSES
E. A. Newman
C. M. Newman
INVENTOR
John O'Leary
By his Attorneys
Baldwin, Hopkins & Peyton

UNITED STATES PATENT OFFICE.

JOHN O'LEARY, OF BAYONNE, NEW JERSEY.

PIPE-COUPLING.

SPECIFICATION forming part of Letters Patent No. 364,666, dated June 14, 1887.

Application filed August 3, 1886. Serial No. 209,846. (No model.)

*To all whom it may concern:*

Be it known that I, JOHN O'LEARY, late of Garfield, in the county of Bergen, now of the city of Bayonne, county of Hudson, and State of New Jersey, have invented certain new and useful Improvements in Pipe-Couplings, of which the following is a specification.

My invention relates to certain improvements, specified by the claim, in couplings of the class employed to unite pipes, the joints between which should be made as tight as possible, and is particularly adapted for use in connection with pipes for conveying natural gas, leakage of which cannot be prevented unless perfectly close joints are made between the adjacent sections of pipe through which the gas flows.

The accompanying drawing shows in longitudinal section adjacent portions of two pipes united by my improved coupling.

The pipes A A are externally threaded at their ends and united by engagement with the internal thread, $a$, of a one-piece coupling-sleeve, B. In addition to the internal thread for uniting the pipes in this (the usual) way, the sleeve is externally threaded, the external threads, $b$ $b$, extending from each end inward a suitable distance, as shown, to receive clamping and packing nuts C C; or, if preferred, the coupling-sleeve may be externally threaded its entire length. The coupling-sleeve is cylindrical or of uniform diameter throughout its length, or so far at least as its external threads extend.

The packing-nuts are perforated, or formed with centrally-open unthreaded heads, so as to embrace the pipes and be adapted to move freely along them, and are provided with internal annular cavities, D D, containing packing $c$ $c$, and with internal end threads, $d$ $d$, to engage the external threads, $b$ $b$, of the coupling-sleeve. The packing and clamping nuts are of uniform and suitable internal diameter at their threaded ends, or throughout their threaded portions, so as to properly engage the threads $b$ $b$ on the cylindrical ends of the coupling-sleeve.

From the above description it will be understood that upon properly adjusting the pipe ends in the coupling-sleeve and tightly screwing up the nuts upon the ends of the sleeve, not only will the packing be forced against the ends of the sleeve and become firmly compressed to prevent leakage, but the pressure of the nuts upon the inclosed ends of the coupling sleeve will materially aid in making the joint tight at both ends of the sleeve, the natural tendency of the force exerted upon the sleeve in screwing up the nuts being to compress or tightly clamp it about the ends of the pipes. A very important advantage thus results from my way of securing the nuts as compared with ways heretofore devised in couplings of this class, such as screwing the nuts upon the ends of the pipes or within the ends of the coupling-sleeve, or making the clamping-nut with a tapering tap and screwing it upon the reduced end of a coupling sleeve, which for a portion of its length is of tapering form externally, thus tightening the joint at one end of the sleeve.

I claim as my invention—

The described pipe-coupling device, consisting of the combination of the cylindrical internally-threaded sleeve B, externally threaded at each end, the two clamping-nuts C, each constructed with an unthreaded open head, an internal thread for engagement with one or other of the external threads upon the coupling-sleeve, and a packing-cavity, D, and the packing $c$ $c$, substantially as set forth.

In testimony whereof I have hereunto subscribed my name.

JOHN O'LEARY.

Witnesses:
 G. W. STAHL,
 J. G. CAMPBELL.